(12) United States Patent
Asai et al.

(10) Patent No.: US 6,189,831 B1
(45) Date of Patent: Feb. 20, 2001

(54) NOREN-TYPE SEPARATING APPARATUS FOR SEPARATING A SMOKING AREA AND A NON-SMOKING AREA IN AN AIRLINER WITH RESPECT TO CIGARETTE SMOKE

(75) Inventors: Takuya Asai; Takumi Nishina; Isao Ishii; Osamu Komatsubara, all of Yokohama; Teruhiko Takusagawa, Tokyo; Kenichi Takahashi, Tokyo; Kazuhiro Egami, Tokyo, all of (JP)

(73) Assignees: Japan Tobacco Inc.; Japan Airlines, both of Tokyo (JP)

( * ) Notice: Under 35 U.S.C. 154(b), the term of this patent shall be extended for 0 days.

(21) Appl. No.: 09/073,352

(22) Filed: May 6, 1998

(30) Foreign Application Priority Data

May 9, 1997 (JP) .................................... 9-116568

(51) Int. Cl.[7] ................................................... B64D 13/02
(52) U.S. Cl. ........................................... 244/118.5; 454/76
(58) Field of Search ............................ 244/118.5, 118.6; 454/342, 357, 76, 74, 75, 49, 238, 239, 252; 105/360, 468; 160/121.1, 133, 310; 296/24.1

(56) References Cited

U.S. PATENT DOCUMENTS

| | | | | |
|---|---|---|---|---|
| 3,687,054 | * | 8/1972 | Boberg | 454/76 |
| 4,121,790 | * | 10/1978 | Graham | 244/118.5 |
| 4,552,325 | * | 11/1985 | Bruensicke | 244/118.5 |
| 4,646,993 | * | 3/1987 | Baetke | 244/118.5 |
| 4,742,760 | * | 5/1988 | Horstman et al. | 244/118.5 |
| 4,742,761 | * | 5/1988 | Horstman | 454/74 |
| 5,181,883 | * | 1/1993 | Hofstra et al. | 454/49 |
| 5,238,282 | * | 8/1993 | Watson et al. | 296/24.1 |
| 5,450,890 | * | 9/1995 | Pinkalla et al. | 160/11.1 |
| 5,816,534 | * | 10/1998 | Schumacher | 244/118.5 |

FOREIGN PATENT DOCUMENTS

| | | |
|---|---|---|
| 4119623C1 | 10/1992 | (DE) . |
| 0301606 | 2/1989 | (EP) . |
| 2458461 | 1/1981 | (FR) . |

\* cited by examiner

*Primary Examiner*—Galen L. Barefoot
(74) *Attorney, Agent, or Firm*—Birch, Stewart, Kolasch & Birch, LLP

(57) ABSTRACT

A slit curtain separating apparatus for separating a smoking area and a non-smoking area, defined in a passenger cabin of an airliner, with respect to cigarette smoke includes a curtain wall, which is suspended from the ceiling of the passenger cabin and extends along the boundary between the smoking and non-smoking areas. The curtain wall has slit curtains arranged individually over left- and right-hand aisles of the passenger cabin and a center curtain located between the aisles. The separating apparatus further includes a vent port array on the ceiling of the smoking area. The vent port array has aisle vent ports corresponding individually to the aisle and a center vent port located between the aisles. Smoke filled air in the smoking area is discharged from these vent ports.

12 Claims, 12 Drawing Sheets

F I G. 3
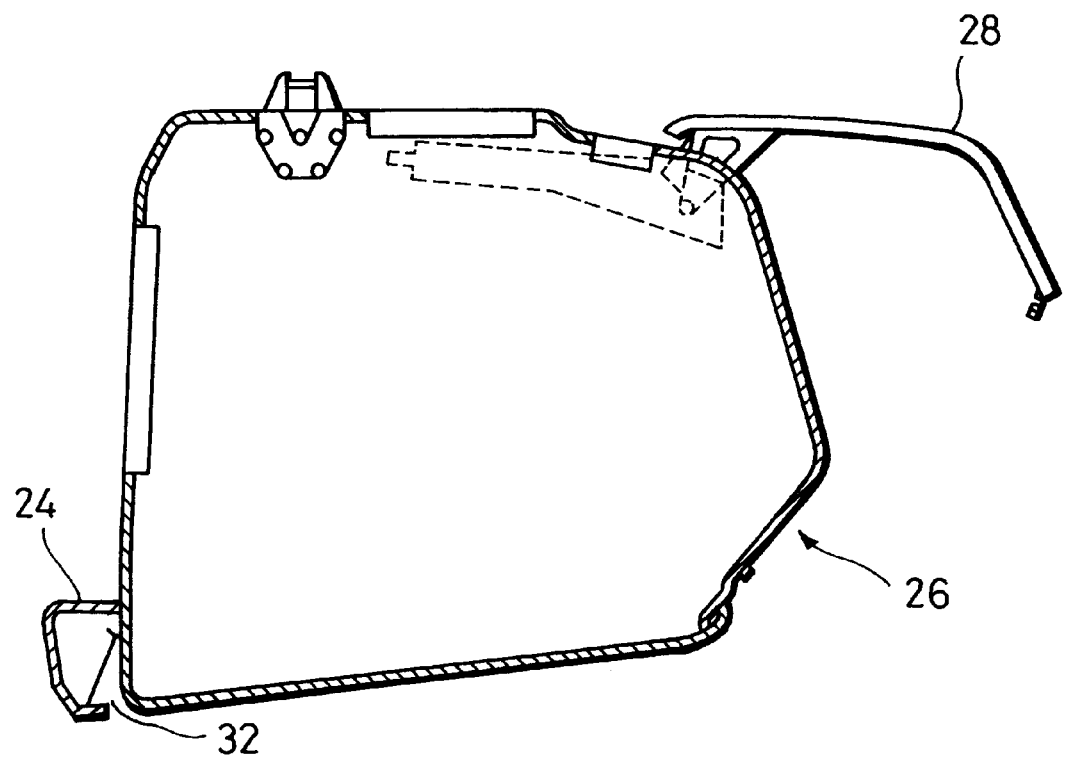

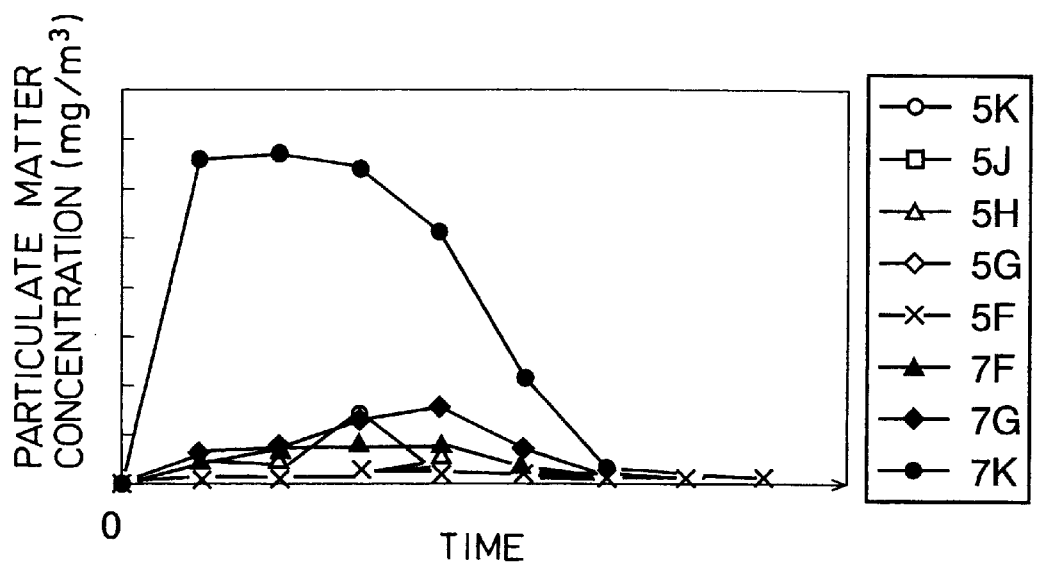
F I G. 13
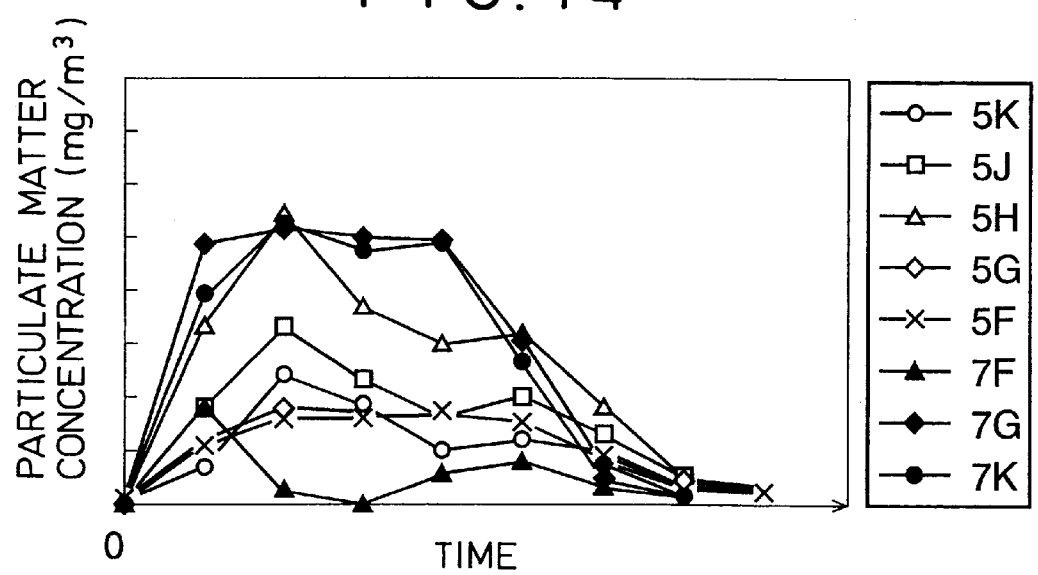
F I G. 14

NOREN-TYPE SEPARATING APPARATUS FOR SEPARATING A SMOKING AREA AND A NON-SMOKING AREA IN AN AIRLINER WITH RESPECT TO CIGARETTE SMOKE

BACKGROUND OF THE INVENTION

1. Field of the Invention

The present invention relates to a slit curtain type separating apparatus for preventing cigarette smoke from drifting from a smoking area into a non-smoking area in an airliner.

2. Description of the Related Art

Smoking is prohibited in passenger cabins of many of airliners, generally. Therefore, smokers tend to avoid making a time-consuming trip by air.

These smokers may possibly be assigned to a smoking compartment that is separated by a partition wall in a passenger cabin. Since the smoking compartment lessens the roominess of the passenger cabin, however, passengers feel more cramped in the cabin. In order to secure the smoking compartment, the layout of equipment, such as galley modules, lavatories, etc., and the seats in the passenger cabin must be changed substantially. Thus, this is hardly feasible. Since the number of smoking seats that can be arranged in the smoking compartment is fixed, moreover, the smoking compartment cannot cope with a change in the number of passengers who need smoking seats.

SUMMARY OF THE INVENTION

The object of the present invention is to provide a slit curtain type separating apparatus, capable of securing a smoking area separate from a non-smoking area in a passenger cabin without changing the layout of equipment and seats in the cabin or using a partition wall.

The above object is achieved by a slit curtain type separating apparatus according to the present invention. The separating apparatus comprises curtain means for partially dividing a smoking area and a non-smoking area defined in a passenger cabin of an airliner, the curtain means including a curtain wall adapted to extend along the boundary between the smoking and non-smoking areas when suspended from the ceiling of the passenger cabin, and exhaust means for discharging air from the smoking area through the ceiling of the smoking area.

According to the separating apparatus described above, the exhaust means generates a negative-pressure region over the smoking area in cooperation with the curtain wall. Accordingly, cigarette smoke and smell generated by smoking in the smoking area are led upward and toward the center of the negative-pressure region, and discharged together with air from the smoking area. Although some of the cigarette smoke and smell reach the ceiling of the passenger cabin and drift along it toward the boundary, their drifts are stopped by the curtain wall and can never get into the non-smoking area. Thereafter, the drifts of the smoke and smell stopped by the curtain wall are seized by air flow directed from the curtain wall to the center of the negative-pressure region, and are discharged together with air from the smoking area.

The curtain wall may include a slit curtain adapted to be hung down over an aisle of the passenger cabin. This slit curtain or never hinders the movement of crew-members and passengers walking in the aisle.

In the case where a pair of aisles, left and right, are arranged in the passenger cabin, the curtain wall includes a center curtain suspended between the aisles and slit curtain suspended over the aisles, individually, and the exhaust means includes first vent ports arranged in ceiling portions over the aisles, individually, and a second vent port located in the middle of a ceiling portion between the aisles. In this case, the first and second vent ports individually generate negative-pressure regions in the smoking area, and air in the smoking area is discharged through the first and second vent ports. More specifically, the first vent ports serve effectively to discharge the cigarette smoke and smell from the aisles.

Preferably, a distance, which corresponds to the space required for the installation of one seat, in the longitudinal direction of the passenger cabin is secured between the first vent ports and the slit curtains, and the second vent port is located nearer to the curtain wall than the first vent ports. With the first and second vent ports thus located near the curtain wall, exhaust capacities required of these vent ports can be minimized.

The curtain means may include a storage unit for the curtain wall. The storage unit is attached to the ceiling of the passenger cabin. When the curtain wall is at work, it is suspended from the storage unit. When not at work, the curtain wall is stored in the storage unit.

In the case where the non-smoking area is situated ahead of the smoking area, the passenger cabin may include a projection screen in front of the non-smoking area. In this case, the hanging length of the curtain wall is restricted to allow all the area of the projection screen to be visible from seats in the last row of the smoking area. Despite the presence of the curtain wall, therefore, all passengers in the passenger cabin can fully enjoy images on the screen.

In the case where there are no curtain walls between the side walls and aisles of the passenger cabin, the separating apparatus may further comprise air outlet means for preventing air from flowing from the smoking area to the non-smoking area between the side walls and aisles of the cabin. In this case, the air outlet means comprises first outlet grilles, arranged in the non-smoking area and extending individually along the side walls of the passenger cabin to the boundary, and second outlet grilles, arranged in the smoking area and extending individually along the side walls of the passenger cabin away from the boundary. The first outlet grilles are adapted to eject air obliquely toward the boundary on the aisle sides, while the second outlet grilles are adapted to eject air obliquely away from the boundary on the side-wall sides. Preferably, the first and second outlet grilles are arranged individually on air outlet lines for feeding conditioned air into the passenger cabin.

Air flow blown out from the first outlet grilles constitutes a barrier to the cigarette smoke and smell that are about to drift from the smoking area to the non-smoking area via the boundary, prevent the smoke and smell from drifting into the non-smoking area. On the other hand, air flow blown out from the second outlet grilles leads the cigarette smoke and smell away from the non-smoking area along the side walls of the passenger cabin, without causing them to stay in local regions between the side walls and the second outlet grilles. In the case where the first and second outlet grilles are arranged individually on the air outlet lines, they can blow out the conditioned air to be fed into the passenger cabin, without requiring any source of air supply therefor.

In the case where the separating apparatus is not provided with the air outlet means, the curtain wall may further include side curtains suspended individually over window seat rows between the side walls and aisles of the passenger cabin, and the exhaust means may include third vent ports arranged individually over the window seat rows.

Further scopes of applicability of the present invention will become apparent from the detailed description given hereinafter. However, it should be understood that the detailed description and specific example, while indicating preferred embodiment of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 3 is a schematic cross-sectional view showing a window-side overhead bin;

FIG. 13 is a graph showing results of measurement of the particle matter concentration in non-smoking seats and smoking seats near a first boundary for dividing a non-smoking area and a smoking area in the rear compartment of the passenger cabin, obtained when the separating apparatus that provides the first boundary is operated;

FIG. 14 is a graph showing results of measurement of the particle matter concentration in the same non-smoking seats and smoking seats as the ones for the case of FIG. 13, obtained without the use of the separating apparatus;

DETAILED DESCRIPTION OF THE PREFERRED EMBODIMENTS

Figure 1:
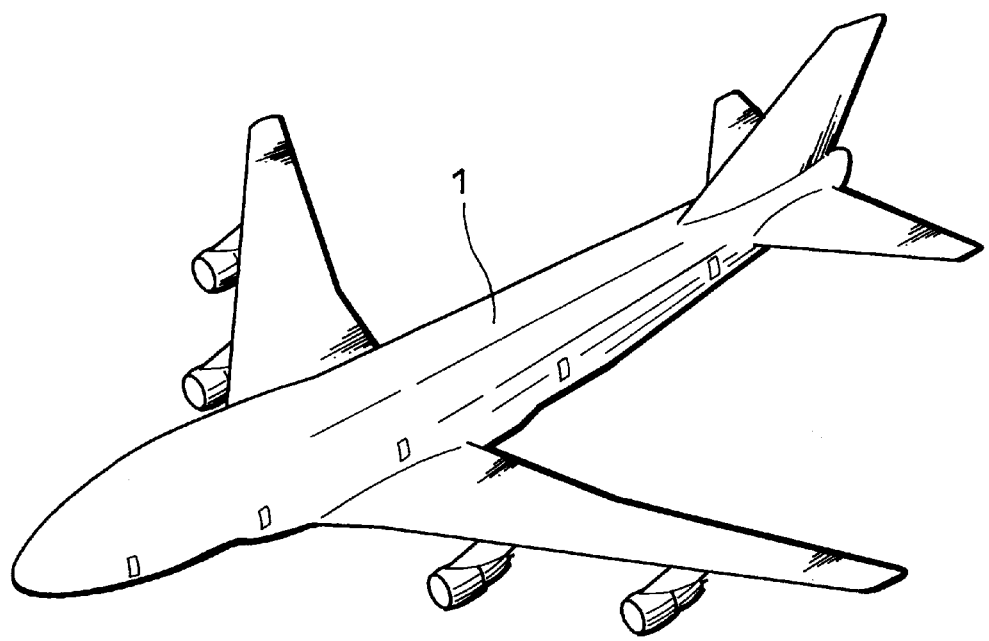
FIG. 1 is a perspective view of a wide-fuselage airliner.
Figure 2:
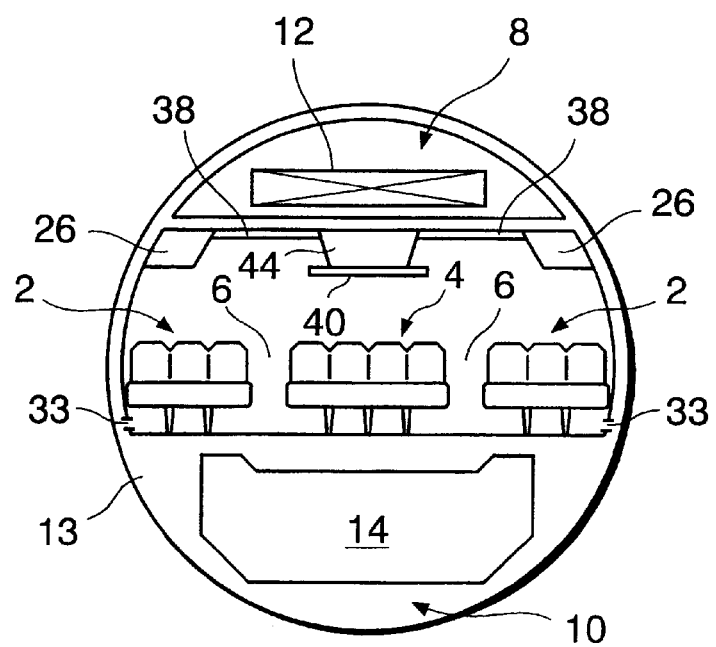
FIG. 2 is a cross-sectional view of the airliner shown in FIG. 1.

Referring to FIG. 1, an airliner called a jumbo jet such as a Boeing 747 is provided with a wide fuselage 1. The fuselage 1 has main and upper cabins therein, the upper cabin being located behind a flight deck. As shown in FIG. 2, a large number of seats are arranged in the main cabin. These seats are divided into three groups, a center seat group 4 and two side seat groups 2 on the left- and right-hand window sides, by aisles 6. Each seat group includes a large number of seat rows arranged in the longitudinal direction of the lower cabin at predetermined intervals. Each of the seat rows includes a plurality of seats that adjoin one another in the transverse direction of the main cabin.

As seen from FIG. 2, a garret space 8 and a lower lobe space 10 are individually defined in the fuselage 1 with the main cabin between them. An air-conditioning system 12 is located in the garret space 8. The air-conditioning system 12 includes air supply piping, which extends in the longitudinal direction of the fuselage 1. The air-conditioning system 12 conditions the outside air sucked in through an air inlet port and air sucked in from the garret space 8, and supplies the conditioned air to the air supply piping. The air inlet port is located near an engine of the airliner. A cargo compartment 14 and an exhaust chamber 13 are secured in the lower lobe space 10. The exhaust chamber 13 can be made to open to the outside air through an outflow valve (not shown). The outflow valve is located at the lower part of the rear end of the fuselage 1.

Overhead bin lines 26 are arranged over the left- and right-hand side seat groups 2, individually. Further, overhead bin lines 44 are arranged left and right over the center seat group 4. A given space is secured between these bin lines 44, and its base is one with a common bottom wall for the bin lines 44. The respective undersurfaces of the overhead bin lines 26 and 44 form part of the ceiling of the main cabin, extending in the longitudinal direction of the main cabin. The left- and right-hand overhead bin lines 26 have their respective air outlet lines on the underside. These air outlet lines are arranged symmetrically with respect to the longitudinal axis of the fuselage 1.

More specifically, as shown in FIG. 3, each overhead bin line 26 has an outside face on the window side. A large number of air chambers 24 are provided at the lower part of the outside face. The chambers 24 are arranged adjacent to one another in the longitudinal direction of the bin line 26. Each of the air chambers 24 is formed by utilizing the outside face of the bin line 26, and has its undersurface flush with that of the bin line 26. The conditioned air outlet line 32 opens in the undersurface of each of the air chambers 24. The line 32 has one side edge that is formed of a round corner portion of the overhead bin line 26. The corner portion of the bin line 26 connects the outside face and undersurface of the bin line 26.

The air chambers 24 are connected to the air supply duct in the garret space 8 by means of branch ducts (not shown), which extend in the side walls of the main cabin. With this arrangement, the air-conditioning system supplies the conditioned air to the chambers 24 through the air supply duct and the branch ducts. The conditioned air is blown out from the chambers 24 into the main cabin through the air outlet line 32. As the conditioned air is blown out through the outlet line 32, the conditioned air is guided by the round corner portion of the overhead bin line 26. Thus, the ejected air from the air outlet line 32 flows along the undersurface of the bin line 26 toward each corresponding aisle 6.

Each of the overhead bin line 26 is divided into individual overhead bins, which have a swingable lid 28, respectively. The lids 28 form the outer surface of the bin line 26 on the aisle side. In FIG. 3, one of the lids 28 of the bin line 26 is shown in opened condition. The lower part of the bin line 26 contains passenger service units (not shown) therein, which contain oxygen masks, overhead reading lights, "fasten seat belt" sign lights, etc. The oxygen masks and the reading lights are installed many as the seats in the seat groups 2.

Like each side overhead bin line 26, each of the center overhead bin line 44 is divided into individual overhead bins, which have a swingable lid, respectively. The lids face the aisle 6 on their corresponding side.

As shown in FIG. 2, each side wall of the main cabin has a large number of vent ports 33 at the lower part thereof. These vent ports 33 are arranged corresponding individually to the seat rows of the seat groups 2. The ports 33 open into the exhaust chamber 13 of the lower lobe space 10. Thus, air in the lower cabin is discharged to the outside through the exhaust chamber 13 and the outflow valve.

Figure 4:
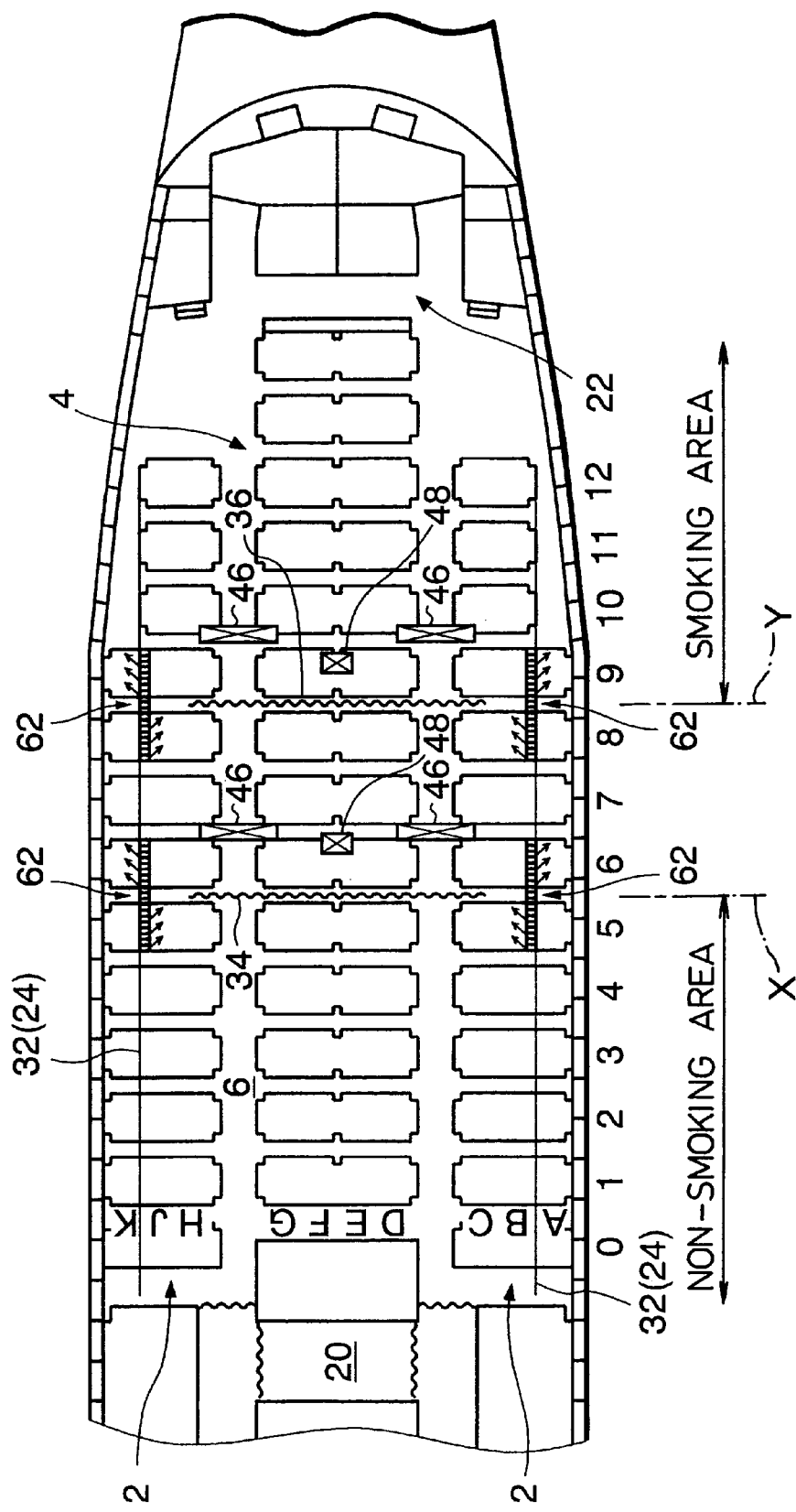
FIG. 4 is a plan view showing a rear compartment of a passenger cabin to which a separating apparatus according to the invention is applied.

FIG. 4 is a plan view showing a rear compartment of the lower cabin (hereinafter referred to simply as "cabin"). The cabin is secured between a galley module 20 and a lavatory module 22, and includes two separating apparatuses, which will be mentioned later. The left- and right-hand air outlet lines 32 extend individually along the side walls of the cabin.

The two air outlet lines 32 blow out the conditioned air toward the upper central part of the cabin. Flows of the conditioned air elected from the lines 32 run against each other over the central portion of the center seat group 4, and form downward flow directed to the floor of the cabin. Thereafter, the conditioned air flows along the floor of the cabin toward their corresponding side walls of the cabin and are discharged through the vent ports 33. Thus, a pair of circle currents are produced in the cabin, left and right as viewed along the cross section of the cabin.

The airliner is designed to fly at a high altitude (about 10,000 meters) in the sky at a temperature of −50° C. or thereabout. In order to satisfy the physiological conditions of crew-members and passengers, therefore, the cabin is pressurized to a given pressure (0.7 to 0.8 atm.) and adjusted to an appropriate temperature inside. The level of pressurization in the cabin can be adjusted by regulating the opening of the outflow valve. The cabin pressurization enables completion of ventilation of the cabin in several minutes.

As seen from FIG. 4, the seat groups 2 and 4 in the cabin can be divided into two areas, a smoking area and a non-smoking area, at a first or second boundary X or Y. For example, the first and second boundaries X and Y are set between seat rows Nos. 5 and 6 and between Nos. 8 and 9, respectively. When the first boundary X is selected, the smoking area is wider. When the second boundary Y is selected, on the other hand, the non-smoking area is wider.

First and second curtain walls 34 and 36 can be suspended from the ceiling of the cabin. The first curtain wall 34 extends along the first boundary X when it is suspended. The second curtain wall 36 extends along the second boundary Y when it is suspended. The first or second curtain wall is suspended from the ceiling when the airliner is in a stable cruising mode, neither taking off nor landing.

Since the first and second curtain walls 34 and 36 include the same components, only one of them will now be described in detail.

Figure 5:
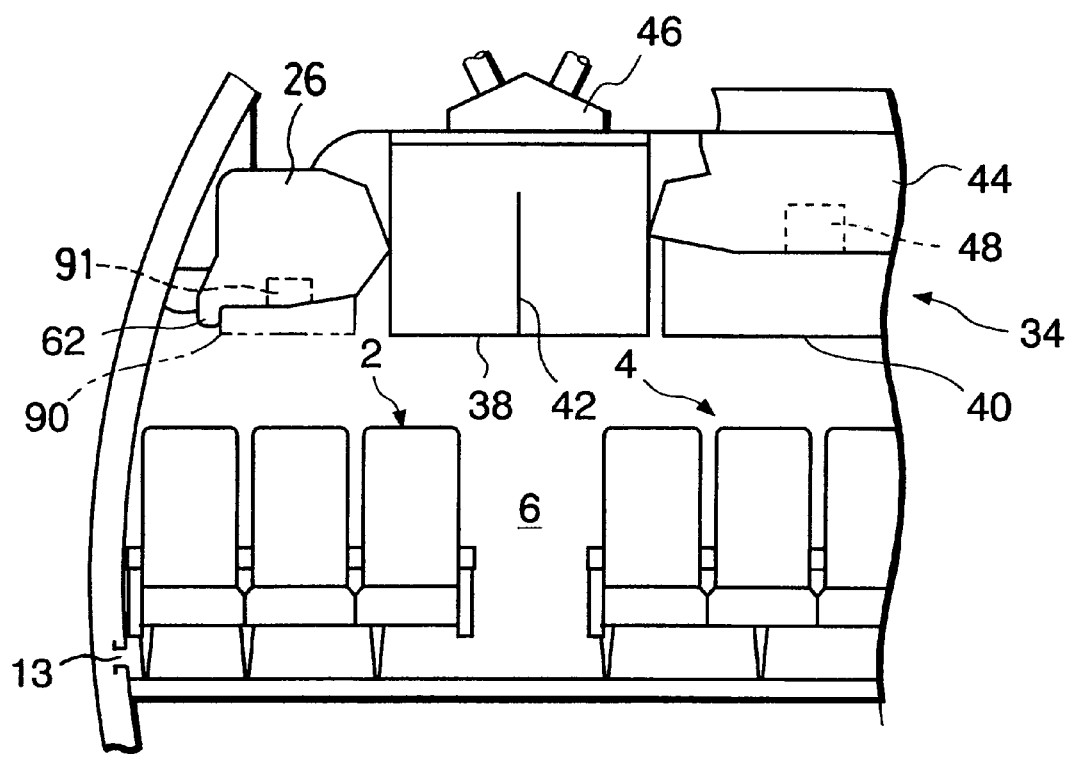
FIG. 5 is a cross-sectional view showing one side of the rear compartment of the passenger cabin.

As shown in FIG. 5, the curtain wall includes a pair of slit curtains or 38, arranged corresponding to the left- and right-hand aisles 6, individually, and a center curtain 40 between the slit curtains 38. The slit curtains 38 and the center curtain 40 are formed of flame-retardant cloth. The slit curtains 38 are suspended from the respective ceilings of their corresponding aisles 6. Each of the slit curtain 38 has a vertical slit 42 in the center, which divides the lower part of the slit curtain 38 left and right. Therefore, the slot curtain 38 function as gates which can be easily opened as each crew-member or passenger, walking in the aisle 6, pushes the left- and right-hand lower parts of the slit curtain 38, on either side of the slit 42, sideways and/or back and forth. Thus, the slit curtain 38 is not a simple curtain that serves only as a partition, but is a cloth material that is suspended on the assumption that it allows the passage of people. Although the slit curtain 38 is hung down over the aisle 6, therefore, it never hinders the movement of the crew-members and passengers.

The center curtain 40 is suspended from the undersurface of the overhead bin lines 44. The undersurface of the bin lines 44, which constitutes part of the ceiling of the cabin, is located below the ceiling of the aisle 6, as seen from FIG. 5. Preferably, the respective lower edges of the slit curtain 38 and the center curtain 40 should be same height above the floor of the cabin.

The ceiling of the smoking area is provided with first and second vent port arrays. The first vent port array is associated with the first curtain wall 34, and the second vent port array with the second curtain wall 36. More specifically, as shown in FIG. 4, each of the vent port array includes left- and right-hand aisle vent ports 46 and a center vent port 48, which are rectangular shape. Each of the aisle vent port 46 is located at the ceiling of its corresponding aisle 6. The vent port 46 has a length along the aisle 6 and a width in a direction perpendicular to the aisle 6. For example, the length and width of the port 46 range from 0.2 to 0.4 m and from 0.5 to 1 m, respectively. The center vent port 48 is provided at the undersurface between the left- and right-hand overhead bin lines 44. For example, the length and width of the center port 48 range from 0.1 to 0.2 m and from 0.3 to 0.5 m, respectively. The port 48 is secured by utilizing the space between the overhead bin lines 44.

The aisle vent ports 46 and the center vent port 48 are located behind their corresponding curtain wall or boundary in the cabin, and given distances are secured between the boundary and the vent ports, respectively. More specifically, a distance, which corresponds to the space required for the installation of one seat row, is secured between the boundary and the aisle vent ports 46, and the center vent port 48 is located nearer to the boundary than the aisle vent ports 46.

Figure 6:
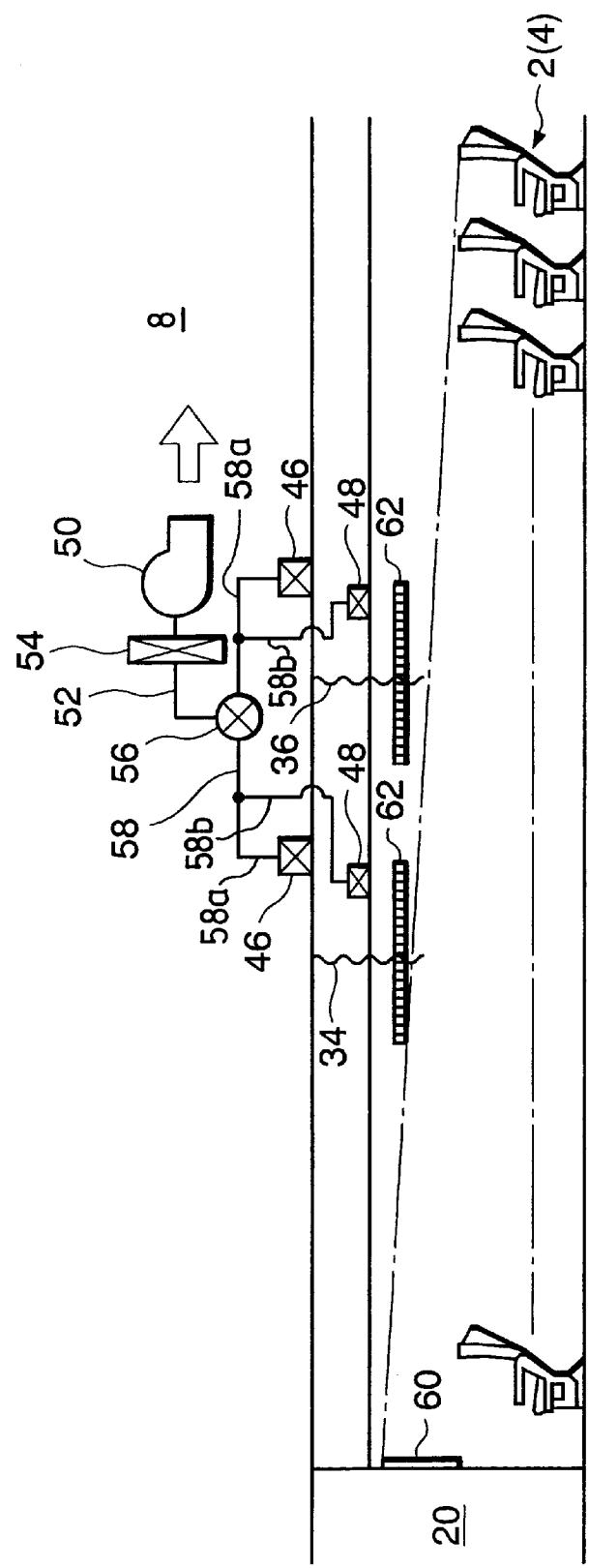
FIG. 6 is a view showing a ventilation system of the passenger cabin.

FIG. 6 shows a ventilation system for the first and second vent port arrays. The ventilation system includes an exhaust fan 50, which is located in the garret space 8. An exhaust duct 52 extends from a suction port of the fan 50, and a filter 54 is installed in the middle of the duct 52. The one end of the duct 52 is connected to a selector valve 56, from which extend two exhaust ducts 58. The one end portion of each exhaust duct 58 is branched, and the resulting branch ducts 58a and 58b are connected individually to the aisle and center vent ports 46 and 48 of the corresponding vent port array. The selector valve 56 connects one of the exhaust ducts 58 to the exhaust duct 52.

When the exhaust fan 50 is actuated, the air in the cabin is sucked in through the vent port array selected by the selector valve 56, that is, through the aisle and center vent ports 46 and 48. The sucked air is discharged from the exhaust fan 50 into the garret space 8 through the vent duct. The garret space 8 opens into the outside air through an aperture (not shown) in the fuselage. Accordingly, the air discharged from the cabin into the space 8 is discharged form the fuselage through the aperture.

The velocity and rate of the air flow discharged through the aisle vent ports 46 are adjusted to 1 m/s to 2 m/s and 13 m³/min to 20 m³/min, respectively. The velocity and rate of the air flow discharged through the center vent port 48 are adjusted to 0.8 m/s to 2 m/s and 4 m³/min to 10 m³/min, respectively. Thus, the rate of the air flow discharged through the entire vent port array ranges from 30 m³/min to 50 m³/min.

On the other hand, the overall volume of the cabin is 130 m³. If the cabin is divided by the first boundary X, the volume of the smoking area is 86 m³. If the cabin is divided by the second boundary Y, the volume of the smoking area is 54 m³. The cabin volume does not include the respective volumes of the overhead bin lines 26 and 44.

As shown in FIG. 6, the galley module 20 has a wall surface that faces the interior of the cabin. A projection screen 60 on which a motion picture is to be projected is provided in the center of the wall surface. When one of the first and second curtain walls 34 and 36 is suspended, its hanging length should be restricted. Thus, the height level of the lower edge of the curtain wall is limited so that passengers in seats in the last row of the smoking area can look at the whole region of the projection screen 60. In FIG. 6, the position of the aisle vent ports 46 indicate the height position of the ceiling of the corresponding aisle 6, while the position of the center vent ports 48 indicates the height position of the undersurface of the overhead bin lines 44.

Figure 7:
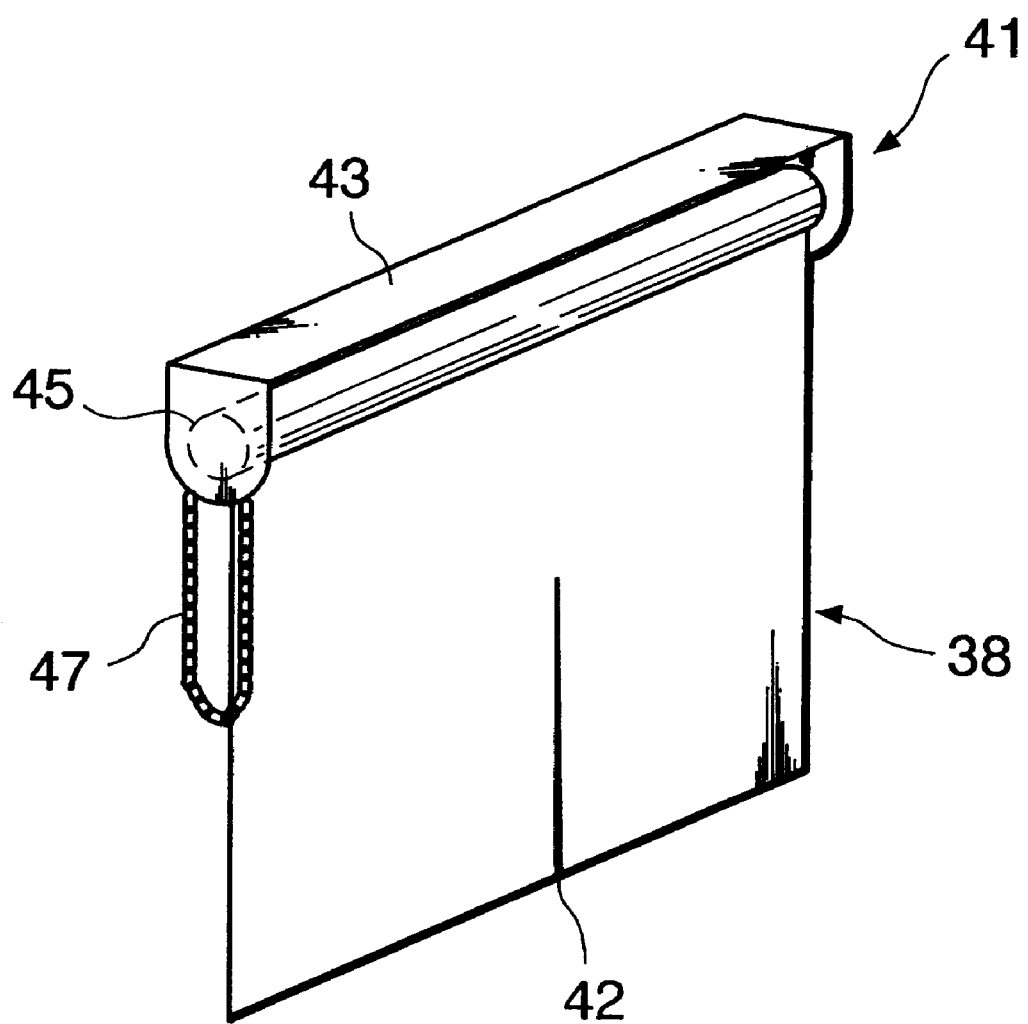
FIG. 7 is a perspective view showing a storage unit for a slit curtain.

The curtain walls 34 and 36 are not limited to the ones that are simply suspended from the ceiling of the cabin. Each of the curtain walls may be stored in a storage unit so as to be able to be drawn out therefrom. FIG. 7 shows a storage unit 41 for the slit curtain 38, for example. The storage unit 41 includes a casing 43 attached to the ceiling of the aisle 6 and a roll 45 rotatably supported in the casing 43. The upper edge of the slit curtain 38 is fixed to the roll 45. The storage unit 41 further includes a chain 47 for rotating the roll 45 in the forward and reverse directions. When the roll 45 is rotated in one direction with the aid of the chain 47, the slit curtain 38 is rolled up by the roll 45 to be stored in the casing 43. If the roll 45 is rotated in the reverse direction by means of the chain 47 with the slit curtain 38 in the stored state, the slit curtain 38 is delivered from the roll 45 and hung down in the manner shown in FIG. 7. The storage manner for the slit curtain 38 is also applicable to the center curtain 40.

Figure 8:
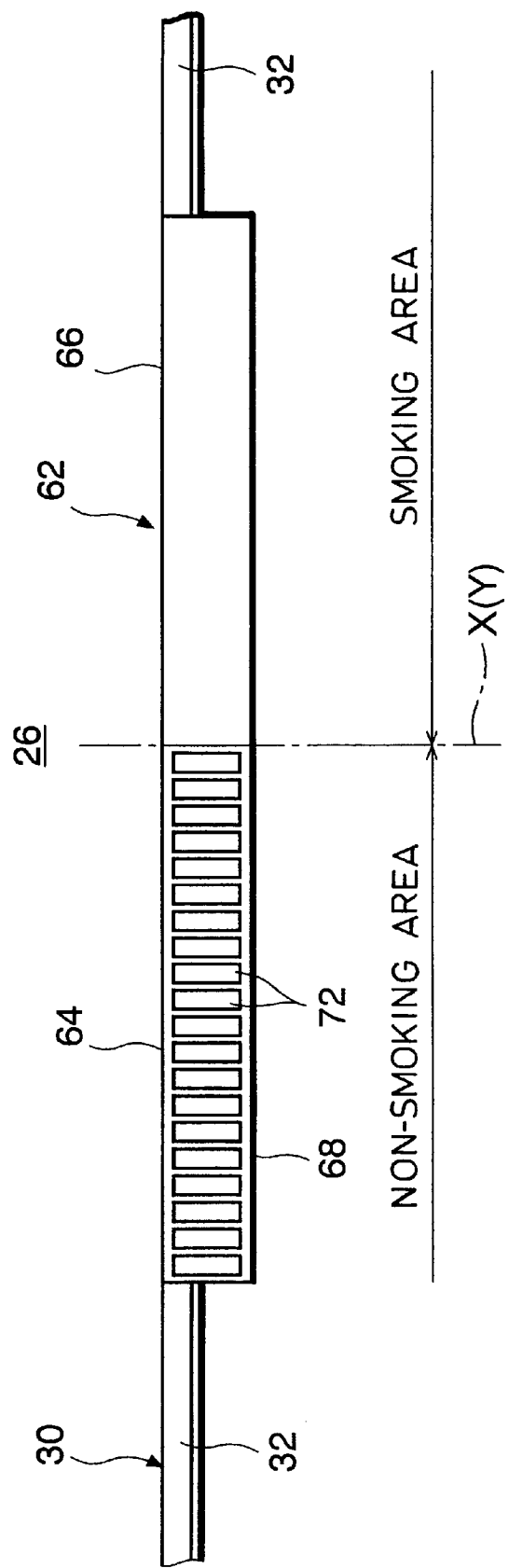
FIG. 8 is a front view of an air outlet grille.

As shown in FIG. 4, two outlet grilles 62 are arranged in each of the left- and right-hand conditioned air outlet lines 32. Each of the outlet grilles 62 covers its corresponding conditioned air outlet line 32 from below and communicates with it. As shown in FIG. 8, each pair of grilles 62 extend longitudinally on either side of their corresponding boundary (X or Y) for the same length. More specifically, each of the outlet grille 62 has a length corresponding to the space required for the installation of two seat in the seat columns.

As shown in FIG. 8, each of the outlet grille 62 includes front and rear grille portions 64 and 66 that are divided longitudinally by its corresponding boundary. The front grille portion 64 has a grille aperture 68, which opens to the aisle side. In FIG. 8, the air outlet line 32 is shown exaggeratedly.

Figure 9:
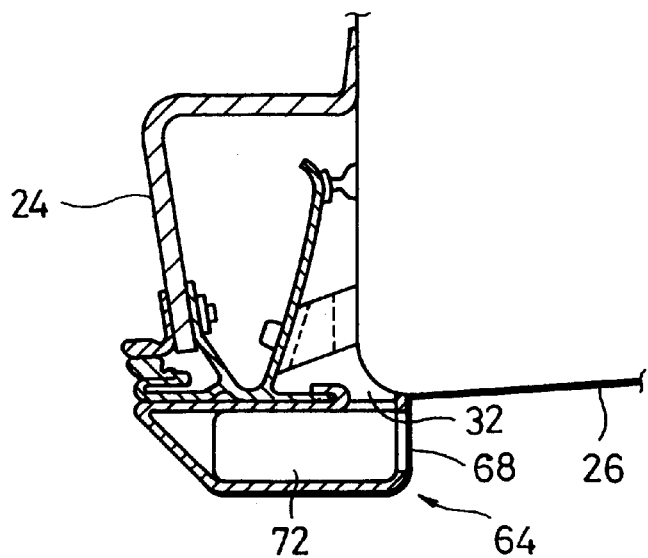
FIG. 9 is a cross-sectional view of a front section of the air outlet grille.

As seen from FIG. 9, the front grille portion 64 communicates with the air chamber 24 by means of its corresponding air outlet line 32. Many deflecting plates 72 are installed in the front grille portion 64. The plates 72, which are arranged at regular intervals in the longitudinal direction of the front grille portion 64, are inclined at an angle of 45° to the outlet line 32, for example. More specifically, each deflecting plate 72 is inclined so that one end thereof on the grille aperture side is located nearer to the boundary than the other end. The flow of the conditioned air supplied from the air chamber 24 to the front grille portion 64 is rectified by the deflecting plates 72, so that the air is blown out obliquely toward the boundary through the grille aperture 68 on the aisle side.

Figure 10:
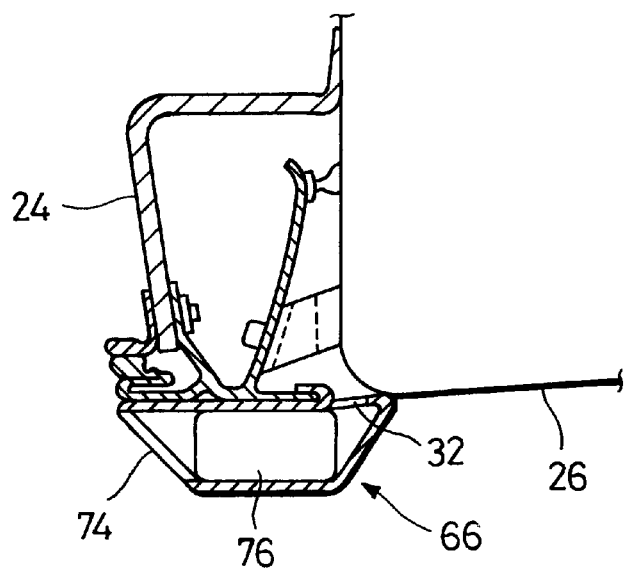
FIG. 10 is a cross-sectional view of a rear section of the air outlet grille.

As seen from FIG. 10, the rear grille portion 66 also has a grille aperture 74, which opens to the window side of the cabin. The rear grille portion 66 also communicates with the air chamber 24 by means of its corresponding air outlet line 32, and deflecting plates 76 are installed therein. The plates 76, which are arranged at regular intervals in the longitudinal direction of the rear grille portion 66, are inclined oppositely to the deflecting plates 72 at an angle of 45° to the outlet line 32.

Thus, the deflecting plates 76 extends at right angles to the deflecting plates 72. The conditioned air supplied from the air chamber 24 to the rear grille portion 66 is blown out obliquely away from the boundary through the grille aperture 74 on the window side of the cabin. The respective tilt angles of the deflecting plates 72 and 76 may be made adjustable.

Figure 11:
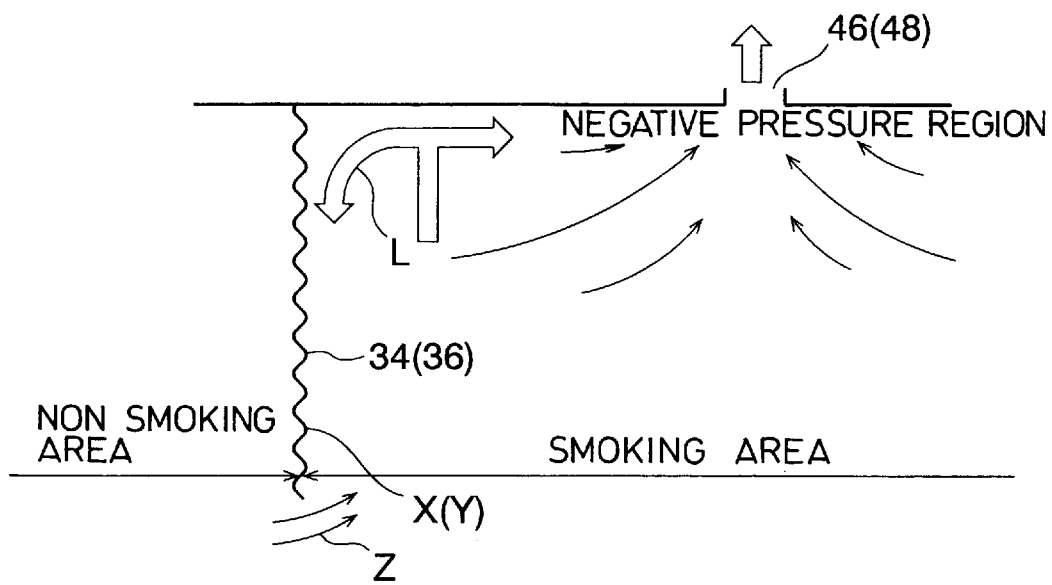
FIG. 11 is a diagram for illustrating the action of the slit curtain and vent ports.

Let it now be supposed that the first boundary X is selected out of the first and second boundaries X and Y. In this case, the first curtain wall 34 is suspended along the first boundary X so as to divide the interior of the cabin into two areas, the non-smoking area on the front side and the smoking area on the rear side. On the other hand, the aisle and center vent ports 46 and 48 of the first vent port array, out of the first and second vent port arrays, are used to discharge air from the cabin. When the air is discharged through the aisle and center vent ports 46 and 48, negative-pressure regions surrounding the vent ports 46 and 48 are formed in the vicinity of the first curtain wall 34 in the smoking area, as shown in FIG. 11. Thus, when a passenger smokes in a smoking seat near the first curtain wall 34, smoke from his or her cigarette and its smell are caught by air flows that are directed to the aisle or center vent port 46 or 48, and are discharged together with the smoke filled air through the port 46 or 48.

If some of the cigarette smoke and its smell drift toward the first boundary X, as indicated by arrow L in FIG. 11, after climbing along the first curtain wall 34 to the ceiling of the cabin, passing through the space between the curtain wall 34 and the first vent port array, they are prevented from getting into the non-smoking area by the wall 34. Thereafter, the smoke and smell intercepted by the first curtain wall 34 are seized by the air flows that are directed to the aisle or center vent port 46 or 48, and are discharged together with the smoke filled air.

Since the aisle and center vent ports 46 and 48 are located near the first curtain wall 34, the negative-pressure regions surrounding the vent ports 46 and 48 generate air flow that flows under the first curtain wall 34, from the smoking area toward the non-smoking area, as indicated by arrows Z in FIG. 11. Even if a passenger smokes in a smoking seat in the first row of the smoking area, therefore, smoke from his or her cigarette and its smell never get under the first curtain wall 34. In consequence, there is no possibility of the smoke and smell flowing from the smoking area into the non-smoking area through the space under the wall 34.

As mentioned before, the first vent port array that includes the left- and right-hand aisle vent ports 46 and the center vent port 48 can effectively discharge cigarette smoke and smell generated from the front side portion of the smoking area.

Since the center vent port 48 is located in the undersurface of the overhead bin lines 44, the size of the vent port 48 is smaller than that of the aisle vent port 46 as mentioned above and moreover the exhaust branch duct 58b for the port 48 is inevitably long and small, compared with the exhaust branch line 58a for the port 46. Therefore, it is difficult to secure the displacement of the air through the port 48 substantially on the same level as the displacement through each aisle vent port 46. However, the center vent port 48 can discharge the cigarette smoke and smell satisfactorily, since it is located nearer to the first curtain wall 34 and lower than the aisle vent ports 46. Thus, the center vent port 48 can have an exhaust capacity substantially equal to that of each of the aisle vent port 46.

Since those portions of the first curtain wall 34 which correspond to the aisles 6 are formed of the curtain slits 38, individually, they never hinder the movement of the crewmembers and passengers.

The first curtain wall 34 extends only from one of the aisles 6 to the other. Accordingly, those portions of the first boundary X which overlies the side seat groups 2 are non-curtain regions that are not covered by the first curtain wall 34. When a passenger smokes in a smoking seat near the non-curtain region, therefore, the curtain wall cannot intercept smoke from his or her cigarette and its smell directed to the non-smoking area. However, the smoke and smell can be intercepted satisfactorily by the work of the left- and right-hand outlet grilles 62. Thus, the cigarette smoke and smell directed from the smoking area to the non-smoking area via the non-curtain region are intercepted effectively at the first boundary X by the conditioned air ejected from the grilles 62, and are led away from the first boundary X, that is, toward the position behind the smoking area.

Figure 12:
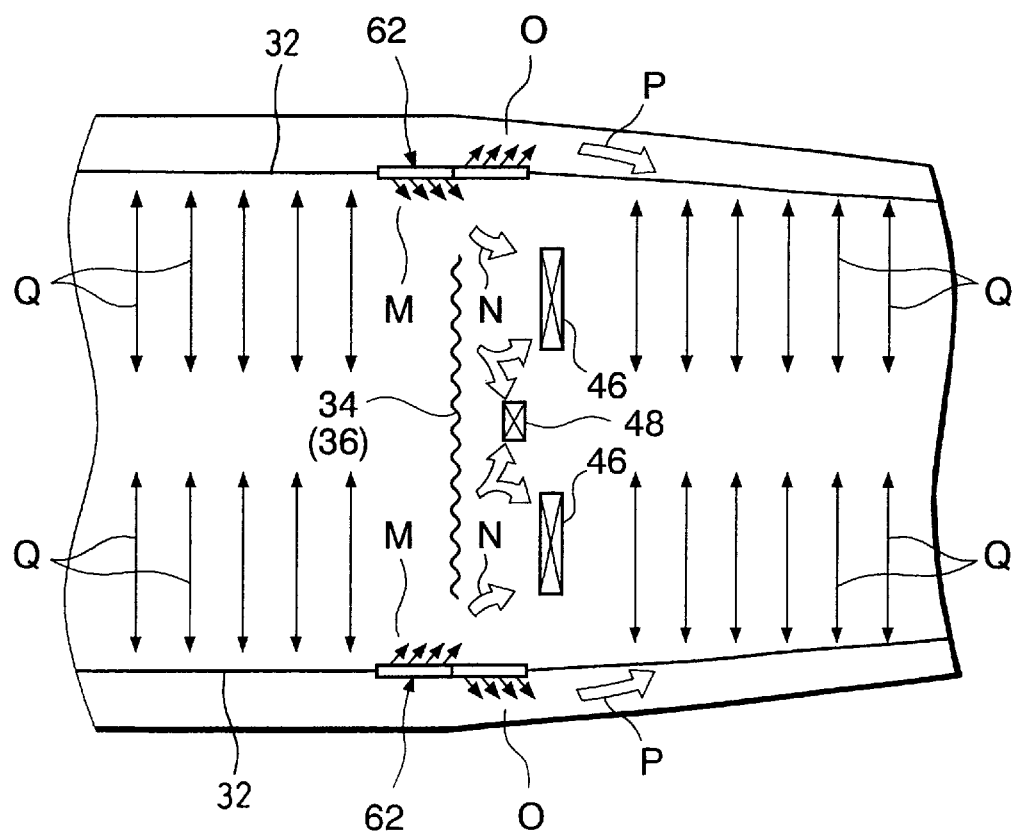
FIG. 12 is a view for illustrating the action of the air outlet grille.

More specifically, the conditioned air ejected through the grille aperture 68 of the front grille portion 64 of each outlet grille 62 is blown out obliquely from the non-smoking area toward the first boundary X, as indicated by arrows M in FIG. 12, and flows across the boundary X. Accordingly, the cigarette smoke and smell generated by smoking in the smoking seat near the non-curtain region and drifting toward the first boundary X are pushed back toward the smoking area, as indicated by arrows N, due to the conditioned air flow indicated by arrows M. In consequence, the cigarette smoke and smell can never flow beyond the first boundary X into the non-smoking area. Further, the conditioned air ejected through the grille aperture 74 of the rear grille portion 66 is blown out obliquely toward the position behind the smoking area on the window side of the cabin, as indicated by arrows O in FIG. 12. After running against the side walls of the cabin, the conditioned air flows along the side walls to the rear part of the cabin. Thus, the cigarette smoke and smell never stay in local regions between the air outlet lines 32 and the side walls of the cabin, near the first boundary X in the smoking area. The smoke and smell are driven backward along the side walls of the cabin, as indicated by arrows P in FIG. 12. Thus, the cigarette smoke and smell in the aforesaid local regions hardly flow from the smoking area into the non-smoking area via the first boundary X.

In FIG. 12, arrows Q indicate the aforementioned pair of circle currents, left and right, individually. No circle current can be generated near the first boundary X. This is because those portions of the air outlet lines 32 near the first boundary X are replaced by the outlet grilles 62, individually.

FIG. 13 shows results of a test conducted by using the aforementioned separating apparatuses, that is, effects of separation of cigarette smoke and smell at the first boundary X. FIG. 14 shows test results obtained without the use of the separating apparatuses. In these tests, lit cigarettes are arranged individually in all the seats in the first row of the smoking area, that is, all the seats with a seat row number 6. Further, dust monitors are arranged individually in seats in the last row of the non-smoking area, that is, seats with seat numbers 5F to 5K, and seats with seat numbers 7F, 7G and 7K in the smoking area. FIG. 4 shows these seat row numbers and seat positions.

Referring to FIG. 13, it can be seen that the particulate matter concentration is hardly increased in the non-smoking area, and that there is a satisfactory effect for the separation of cigarette smoke and smell at the first boundary X. Referring to FIG. 14, on the other hand, the particulate matter concentration is increased in the non-smoking area, and there is hardly any effect for the separation of cigarette smoke and smell between the smoking and non-smoking areas. Further, comparison between the test results of FIGS. 13 and 14 indicates that the separating apparatuses serve to reduce the particulate matter concentration in the non-smoking area by about $1/5$ to $1/10$.

Figure 15:
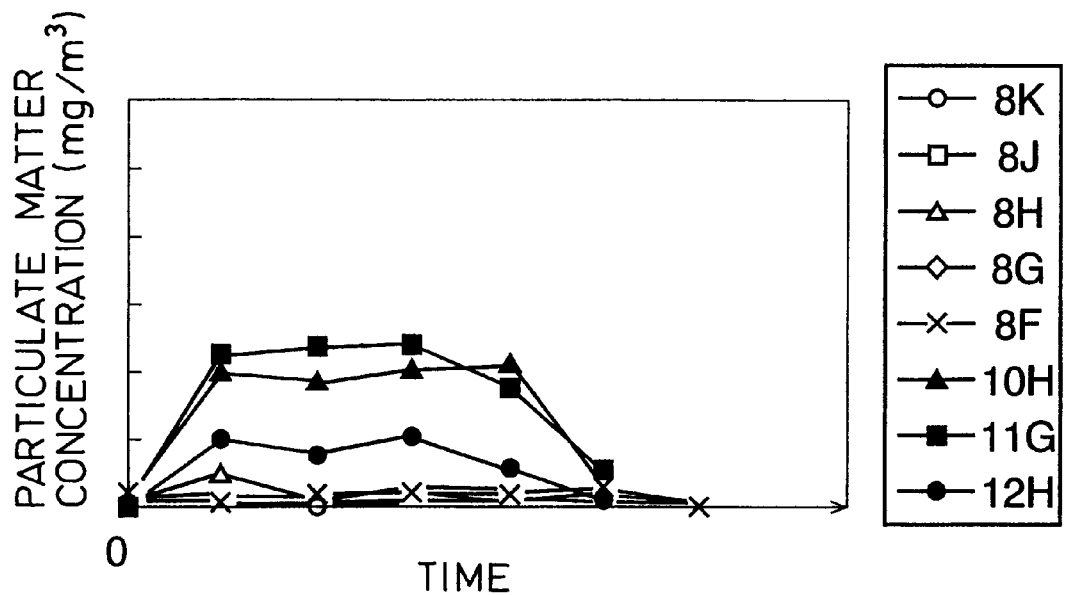
FIG. 15 is a graph showing results of measurement of the particle matter concentration in non-smoking seats and smoking seats near a second boundary, obtained when the separating apparatus that provides the second boundary is operated.
Figure 16:
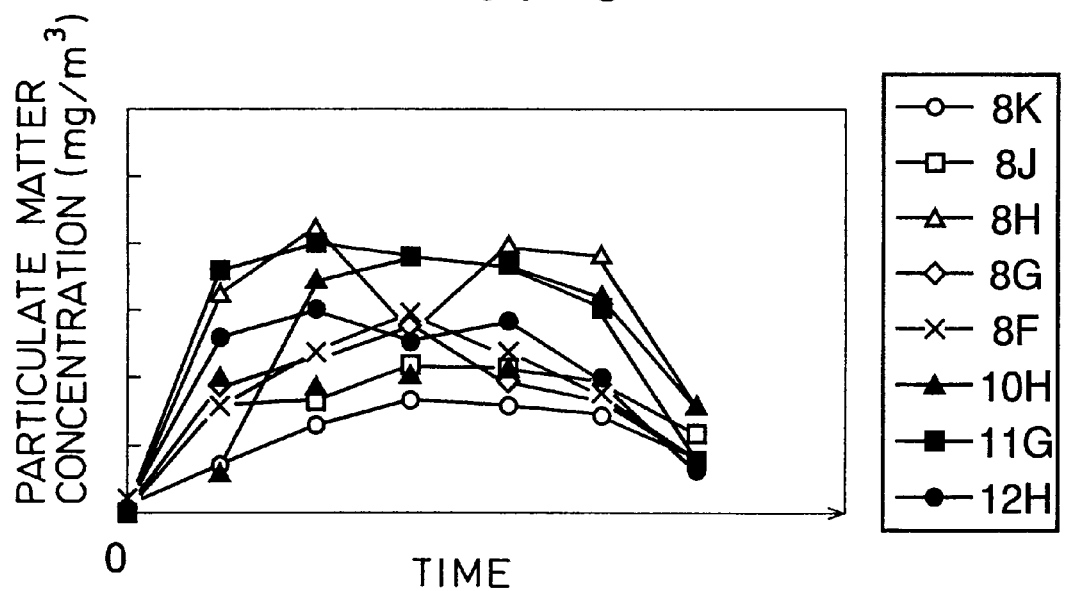
FIG. 16 is a graph showing results of measurement of the particle matter concentration in the same non-smoking seats and smoking seats as the ones for the case of FIG. 15, obtained without the use of the separating apparatus.

If the second boundary Y is selected, on the other hand, the cabin is divided into the smoking and non-smoking areas by the second boundary Y or the second curtain wall 36. The second boundary Y has the same separation effect for cigarette smoke and smell as the first boundary X. Also in this case, the same tests were conducted by using the separating apparatus associated with the second boundary Y and without the use of the separating apparatus, respectively. FIGS. 15 and 16 show results of these tests. As seen from comparison between FIGS. 15 and 16, cigarette smoke and smell are prevented effectively from flowing from the smoking area into the non-smoking area at the second boundary Y.

In the case where the first and second boundaries X and Y are provided in advance, as mentioned before, one of them is selected depending on the number of smokers in the cabin so that the separating apparatus associated with the selected boundary can be used. The first boundary X is selected if there are many smokers, while the second boundary Y is selected if there are few smokers. Thus, the number of seats in the smoking area can be varied easily.

The separating apparatuses may be set in a front compartment of the main cabin or in the upper cabin, as well as in the rear compartment of the main cabin. The smoking area may be located in front of the non-smoking area with a boundary between them. As indicated by two-dot chain line in FIG. 5, moreover, a side curtain 90 may be suspended along the boundary from the undersurface of each of the left- and right-hand overhead bin lines 26, in place of or together with each outlet grille 62. In this case, the lower edge of the side curtain 90 is same height as those of the slit curtains 38 and the center curtain 40. In the case where the side curtain 90 is used in place of the outlet grille 62, the undersurface of each overhead bin line 26 should preferably be provided with a side vent port 91, which has the same function as the aforementioned center vent port 48.

Figure 17:
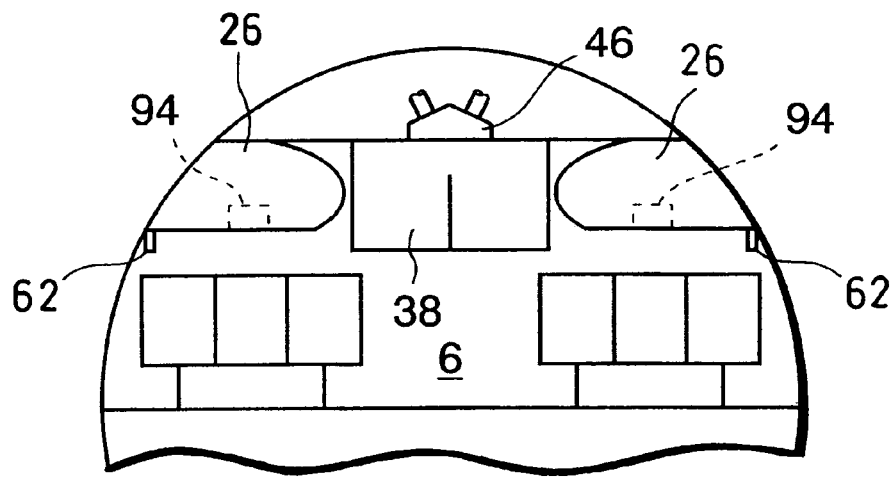
FIG. 17 is a schematic view of a separating apparatus applied to a narrow-fuselage airliner.

The separating apparatuses according to the present invention are applicable to a narrow-fuselage airliner that has only one aisle in its cabin, as well as to the wide-fuselage airliner described herein. In this case, a curtain wall includes only a slit curtain 38, which is suspended from the ceiling of an aisle 6, as shown in FIG. 17. The ceiling of the aisle 6 is provided with an aisle vent port 46 that is combined with the slit curtain 38. In this case, regions over left- and right-hand side seat groups are non-curtain regions at the boundary between smoking and non-smoking areas. Therefore, outlet grilles 62 should be provided in like manner under overhead bin lines 26, individually.

Figure 18:
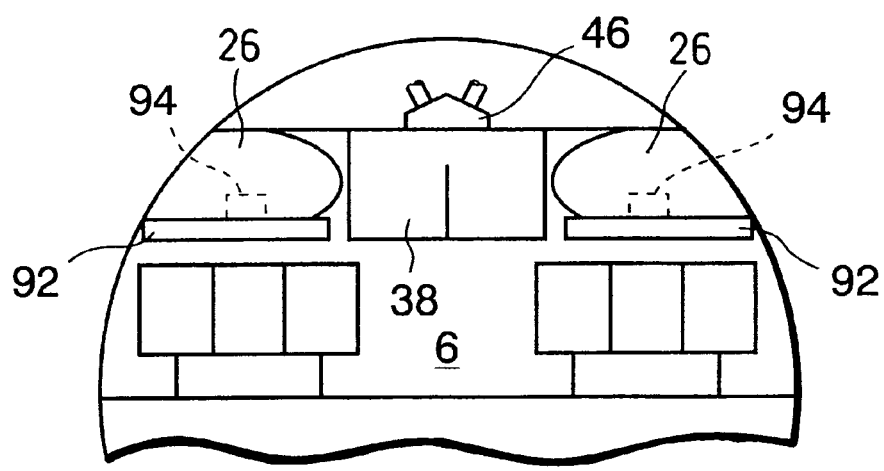
FIG. 18 is a schematic view of another separating apparatus applied to a narrow-fuselage airliner.

Referring to FIG. 18, there is shown a curtain wall that includes side curtains 92 in addition to slit curtains 38. The side curtains 92 are suspended from the respective undersurfaces of left- and right-hand overhead bin lines 26, individually. In this case, the undersurface of each bin line 26 is provided with a side vent port 94, which has the same function as the aforementioned center vent port 48.

Further, the separating apparatuses according to the present invention may be provided with air curtains in place of the slit curtains of the curtain walls.

What is claimed is:

1. A separating apparatus for separating a smoking area and a non-smoking area, defined in a passenger cabin of an airliner, with respect to cigarette smoke, comprising:

curtain means for partially dividing the smoking and non-smoking areas, said curtain means including a curtain wall adapted to extend along a boundary between the smoking and non-smoking areas when suspended from a ceiling of the passenger cabin, The apparatus according to claim 1, wherein said cutain wall includes a slit curtain adapted to be hung down over an aisle of the passenger cabin, said slit curtain having a slit for splitting an under portion of said slit curtain to allow a passenger to pass through said slit curtain; and exhaust means for discharging air from the smoking area through the ceiling of the smoking area, said exhaust means including an aisle exhaust port located in a portion of the ceiling which is near said slit curtain, said aisle exhaust port producing an upward air flow directed to the ceiling in the smoking area.

2. The apparatus according to claim 1, wherein said curtain means includes a curtain wall extending along all the boundary except the portions thereof between the side walls and an aisle of the passenger cabin, and which further comprises air outlet means for preventing air from flowing from the smoking area to the non-smoking area between the side walls and aisle of the passenger cabin.

3. The apparatus according to claim 2, wherein said air outlet means comprises: first outlet grilles arranged in the non-smoking area and extending individually along the side walls of the passenger cabin to the boundary, the first outlet grilles being adapted to eject air obliquely toward the boundary on the aisle side; and second outlet grilles arranged in the smoking area and extending individually along the side walls of the passenger cabin to the boundary, the second outlet grilles being adapted to eject air obliquely away from the boundary on the side-wall side.

4. The apparatus according to claim 3, wherein said first and second outlet grilles are arranged individually on air outlet lines for feeding conditioned air into the passenger cabin.

5. The apparatus according to claim 1, wherein the passenger cabin includes a pair of left and right aisles and said slit curtains suspended over the aisles, respectively, and a center curtain suspended between said slit curtains.

6. The apparatus according to claim 5, wherein said exhaust means includes said aisle exhaust ports located over the aisles, respectively, and a center exhaust port located in a portion of the ceiling between the aisles.

7. The apparatus according to claim 6, wherein said exhaust means has a distance corresponding to a space required for installation of one seat, in the longitudinal direction of the passenger cabin between said aisle exhaust ports and said slit curtains.

8. The apparatus according to claim 6, wherein said center exhaust port is located nearer to said curtain wall than said aisle exhaust ports.

9. The apparatus according to claim 7, wherein said center exhaust port is located nearer to said curtain wall than said aisle exhaust ports.

10. The apparatus according to claim 1, wherein said curtain means further includes a storage unit for rolling up and storing the curtain wall.

11. The apparatus according to claim 1, wherein the passenger cabin further includes a projection screen in front of the non-smoking area located ahead of the smoking area, and a hanging length of said curtain wall is restricted to allow all the area of the projection screen to be visible from seats in the last row of the smoking area.

12. The apparatus according to claim 1, wherein the passenger cabin includes a center aisle, and said curtain wall further includes side curtains suspended respectively over window seat rows between side walls of the passenger cabin and the center aisle, and said exhaust means further includes vent ports arranged over the window seat rows, respectively.

* * * * *